(12) United States Patent
Laroia et al.

(10) Patent No.: US 6,804,528 B1
(45) Date of Patent: Oct. 12, 2004

(54) APPARATUS AND METHOD FOR USE IN THE MULTICAST OF TRAFFIC DATA IN WIRELESS MULTIPLE ACCESS COMMUNICATIONS SYSTEMS

(75) Inventors: Rajiv Laroia, Basking Ridge, NJ (US); Junyi Li, Matawan, NJ (US); Sathyadev Venkata Uppala, Scotch Plains, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 761 days.

(21) Appl. No.: 09/706,534

(22) Filed: Nov. 3, 2000

(51) Int. Cl.$^7$ ................................................ H04B 7/01
(52) U.S. Cl. ........................ 455/503; 455/518; 455/521
(58) Field of Search ................................ 455/517, 518, 455/519, 520, 521, 523, 524, 404; 379/37

(56) References Cited

U.S. PATENT DOCUMENTS

| | | | |
|---|---|---|---|
| 5,392,287 A | | 2/1995 | Tiedemann, Jr. et al. |
| 5,465,391 A | | 11/1995 | Toyryla |
| 5,574,970 A | * | 11/1996 | Linquist et al. ............ 455/13.1 |
| 5,923,649 A | | 7/1999 | Raith |
| 6,122,483 A | * | 9/2000 | Lo et al. ..................... 455/12.1 |
| 6,128,472 A | * | 10/2000 | Harel et al. ................. 340/7.21 |
| 6,151,309 A | * | 11/2000 | Busuioc et al. ............. 370/328 |
| 6,188,911 B1 | * | 2/2001 | Wallentin et al. ........... 455/524 |
| 6,477,377 B2 | * | 11/2002 | Backstrom et al. ......... 455/446 |
| 6,633,765 B1 | * | 10/2003 | Maggenti .................... 455/503 |

FOREIGN PATENT DOCUMENTS

| | | |
|---|---|---|
| WO | WO 94/28687 A1 | 12/1994 |
| WO | WO 96/10895 A1 | 4/1996 |

OTHER PUBLICATIONS

K. Al Agha, et al., "Dynamic Slot Allocation in GPRS Systems", VTC 2000–Spring. 2000 IEEE 51st Vehicular Technology Conference Proceedings. Tokyo, Japan, May 15–188, 2000, IEEE Vehicular Technology Conference, New York, NY: IEEE, US, vol. 3 of 3. Conf. 51, May 15, 2000, pp. 2355–2359, XP000968425, ISBN: 0–7803–5719–1.

* cited by examiner

*Primary Examiner*—Tilahun Gesesse (57) ABSTRACT

In a wireless communications system, multicast messages are transported to groups of wireless terminals by employing a common control channel to transmit a multicast paging message indicating that multicast traffic data is to be transmitted to a particular group of wireless terminals. In an embodiment of the invention, the essential information transmitted in the common control channel is the identifier of the group of wireless terminals intended to receive the multicast traffic data and the location of a traffic channel on which the multicast traffic is to be transported in a channel resource which may include a representation of bandwidth and time interval. In accordance with an aspect of the invention, the common control channel is associated with a traffic channel in a prescribed fixed manner. Further, the traffic channel used for the purpose of multicast can be the same traffic channel used for the normal point-to-point transmission of traffic data.

38 Claims, 4 Drawing Sheets

APPARATUS AND METHOD FOR USE IN THE MULTICAST OF TRAFFIC DATA IN WIRELESS MULTIPLE ACCESS COMMUNICATIONS SYSTEMS

RELATED APPLICATIONS

U.S. patent applications Ser. No. 09/706,377 and Ser. No. 09/706,132 were filed concurrently herewith.

TECHNICAL FIELD

This invention relates to wireless communications systems and, more particularly, to wireless communications between wireless terminals and base stations in a multiple access communications system.

BACKGROUND OF THE INVENTION

Multicast of traffic data involves sending the same message to more than one destination, e.g., to multiple wireless terminals. Multicast is an important function in wired networks. As wireless links are becoming part of integrated wireless and wired networks, efficient support of multicast in wireless systems is required.

In traditional wireless systems, each active wireless terminal, i.e., mobile unit, is given a dedicated control channel and a dedicated traffic channel on which the mobile and the base station exchange point-to-point control and traffic messages, respectively. A brute-force technique of realizing multicast is to transmit the traffic individually in the dedicated traffic channels of all intended wireless terminals. However, the same message is repeatedly transmitted a number of times over the air link, which wastes a significant amount of the wireless channel resource.

In some wireless systems, there is a common control channel in the downlink, which all the wireless terminals monitor. Thus, another technique of realizing multicast is to transmit the multicast message over the common control channel. Unfortunately, in general, the common control channel is designed to transport only system-related information and, therefore, it has only a relatively low data rate. Thus, transmitting multicast traffic data over the common control channel generally takes a very long time and doing so also introduces a long delay in transmitting other normal common control messages. Such long transmission intervals and long delays are extremely undesirable.

SUMMARY OF THE INVENTION

These and other problems and limitations of prior known wireless communications system are overcome by employing a common control channel to transmit a multicast paging message indicating that multicast traffic data is to be transmitted to a particular group of wireless terminals. In an embodiment of the invention, the essential information transmitted in the common control channel is the multicast group identifier of the group of wireless terminals intended to receive the multicast traffic data and the location of a traffic channel on which the multicast traffic is to be transported in a channel resource which may include a representation of bandwidth and time interval. In accordance with an aspect of the invention, the common control channel is associated with a traffic channel in a prescribed fixed manner. Further, the traffic channel used for the purpose of multicast can be the same traffic channel used for the normal point-to-point transmission of traffic data. In an embodiment of the invention, the common control channel is the assignment channel used in channel resource allocation for both multicast and point-to-point traffic, and is associated, in a prescribed fixed manner, to the traffic channel also used for both multicast and point-to-point traffic.

DETAILED DESCRIPTION

Figure 1:
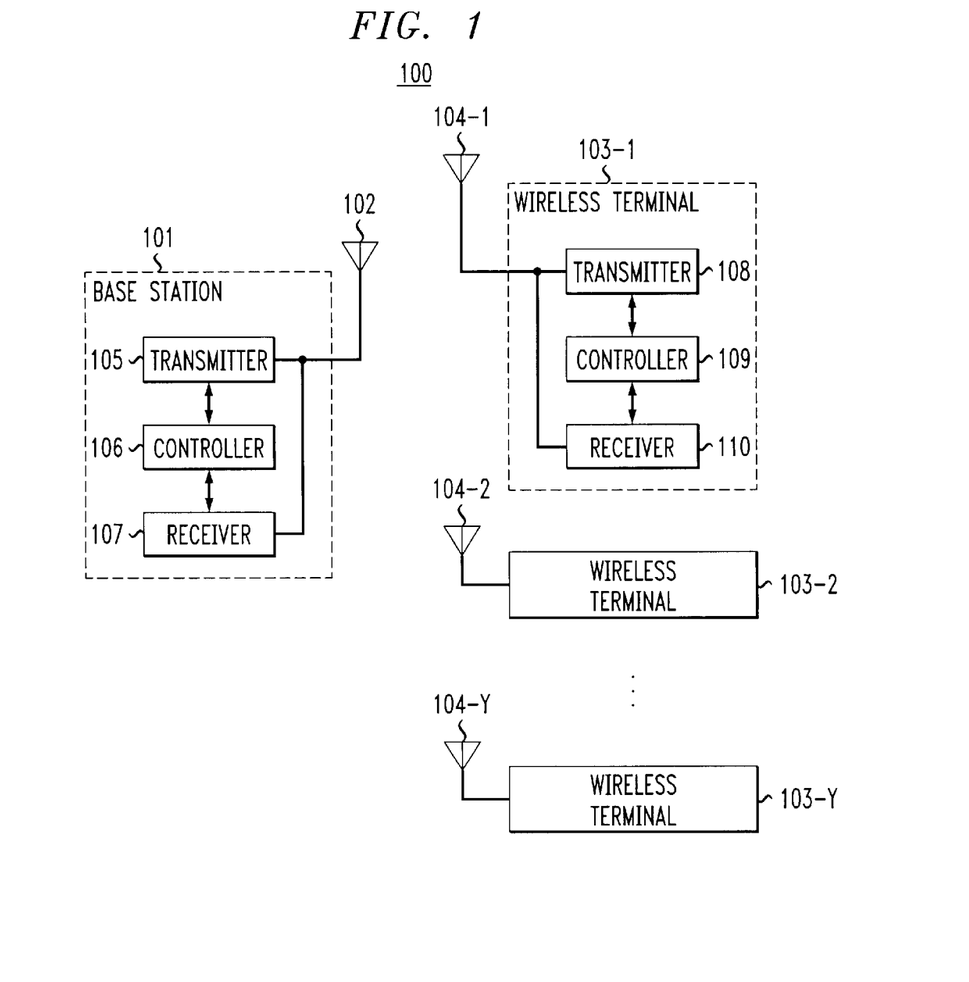
FIG. 1 shows, in simplified block diagram form, a wireless multiple access communications system in which the invention may be advantageously employed.

FIG. 1 shows, in simplified block diagram form, a wireless mobile multiple access communications system in which the invention may be advantageously employed. It should be noted that although applicants' unique invention will be described in the context of a wireless mobile communications system, it has equal application to nonmobile, e.g., fixed wireless communications systems. As indicated above, one such mobile wireless communications system is OFDM based spread spectrum multiple access.

Specifically, shown in FIG. 1 is a mobile multiple access wireless communications system 100. System 100 includes base station 101 including antenna 102 and one or more remote wireless terminals, e.g., mobile units 103-1, 103-2 through 103-Y including associated antennas 104-1, 104-2 and 104-Y, respectively. Transmission of signals is from and to base station 101 to and from remote wireless terminals 103. All of wireless terminals 103 share the transmission spectrum in a dynamic fashion. More specifically, both point-to-point and multicast traffic data is transported via the traffic channel and the traffic channel is allocated dynamically among the wireless terminals. In accordance with the invention, paging messages for notifying the arrival of multicast traffic data to wireless terminals 103 are transported on a common control channel. In one embodiment, a particular traffic channel is associated with the common control channel in a prescribed fixed manner. In one specific example, the common control channel is an assignment channel including assignment segments. In this example, to allocate traffic channel resource for point-to-point traffic, base station 101 dynamically broadcasts the assignment of traffic channels with assignment segments to the remote wireless terminals 103 by use of a simple identifier for each of the active wireless terminals 103. Additionally, to allocate traffic channel resource for multicast traffic, a multicast group identifier that identifies the group of wireless terminals 103 that the multicast traffic data is to be transported to is also transported to the active wireless terminals 103 via the assignment segments. Remote wireless terminals 103 monitor the assignment segments to detect whether their individual and/or multicast group identifier is included therein. After detecting its identifier, a particular remote wireless terminal 103 then receives the multicast or point-to-point traffic data in the associated traffic data channel.

In this example, base station 101 includes transmitter 105, receiver 107 and controller 106 for transmitting and receiving wireless messages via antenna 102. Controller 106 is employed to control operation of transmitter 105 and receiver 107, in accordance with the invention. Similarly, in this example, each of wireless terminals 103-1 through 103-Y includes transmitter 108, receiver 110 and controller 109 for transmitting and receiving wireless messages via antenna 104. Controller 109 is employed to control operation of transmitter 108 and receiver 110, in accordance with the invention.

Figure 2:
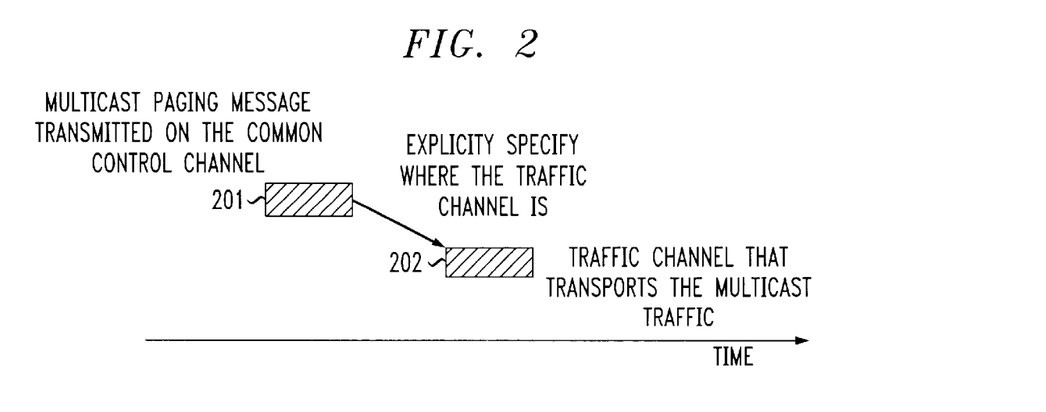
FIG. 2 is a graphical representation of a multicast paging message being transported on a common generic control channel.

FIG. 2 is a graphical representation of a multicast paging message being transported on a common generic control channel. All active wireless terminals 103 associated with the base station 101 continuously monitor the common control channel. When multicast traffic arrives, the base station 101 sends a multicast paging message over the common control channel 201. The multicast paging message includes a multicast group identifier identifying the group of wireless terminals 103 that are intended to receive the multicast traffic and where the multicast traffic will be transmitted in the downlink, i.e., bandwidth and time interval. In general, this includes the specification of a traffic channel 202 and perhaps a particular transmission time interval. Typically, the common control channel may be shared for other purposes such as transmitting other system related information. In this example, a specific control message header is included for the multicast paging message.

A possible drawback of this multicast technique is that the multicast paging messages may have a large size. Consequently, the control overhead may be large for multicast, especially if multicast traffic arrives sufficiently frequently. In such an instance, transmitting the multicast paging messages may also introduce delay of transmitting other control messages, which are also to be transmitted over the same common control channel.

Figure 3:
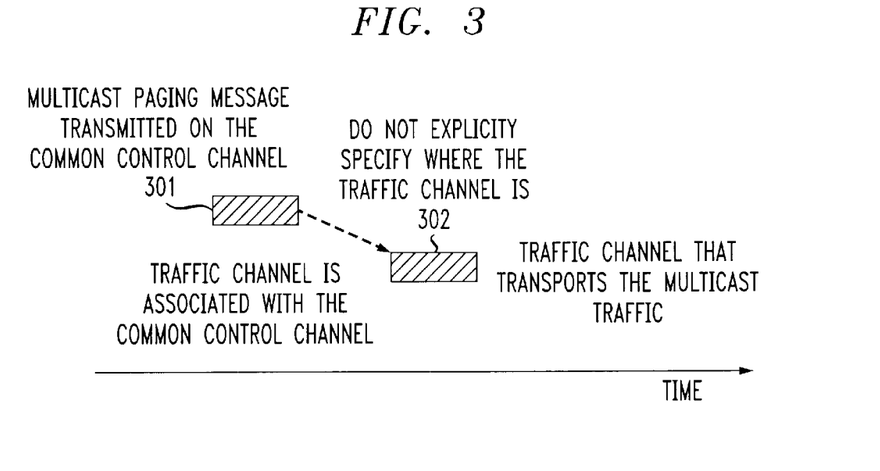
FIG. 3 is a graphical representation illustrating a simplified multicast paging message being transported on a common generic control channel.

FIG. 3 is a graphical representation illustrating a simplified multicast paging message being transported on a common generic control channel. Thus, shown in FIG. 3 is a technique of reducing the overhead of transmitting the multicast paging messages, where a traffic channel is associated with the common control channel in a prescribed manner, in accordance with the invention. In this example, the need of explicitly specifying where the multicast traffic will be transmitted in the downlink is eliminated, thereby significantly reducing the overhead. Hence, when the base station 101 transmits a multicast paging message 301 on the common control channel, the corresponding multicast traffic 302 will be transmitted on the associated traffic channel. Similarly, when the intended mobiles 103 get the multicast paging message on the common control channel, they then receive the corresponding multicast traffic from the associated traffic channel.

Note that multicast traffic generally arrives in a random manner. Therefore, it may not be cost-effective to dedicate a traffic channel for the multicast purpose. Ideally, the traffic channel associated with the common control channel should also be used to transmit normal point-to-point traffic when multicast traffic is not present. Hence, the traffic channel is flexibly switched between multicast and point-to-point traffic, in accordance with an aspect of the invention.

Figure 4:
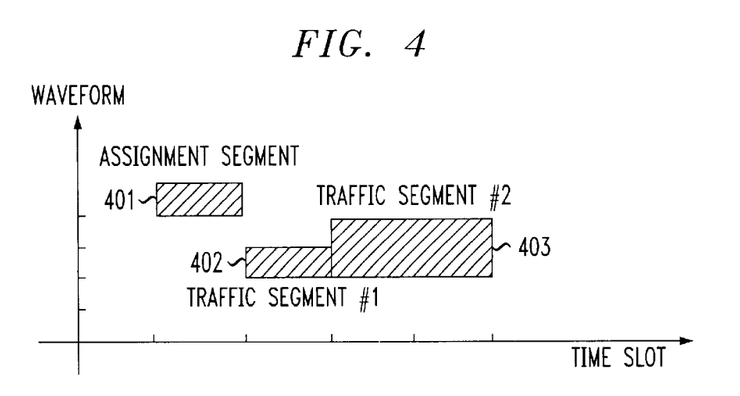
FIG. 4 is a graphical representation illustrating an assignment segment and a number of traffic segments useful in describing the invention.

FIG. 4 illustrates the physical mechanism of managing the channel resource in the form of traffic segments 402 and 403 and an assignment segment 401 employed in one embodiment of the invention. The downlink wireless channel resource (bandwidth and time interval) is partitioned into an assignment channel including a plurality of assignment segments 401, etc., and a traffic channel including a plurality of traffic segments 402, 403, etc. Also shown are time slots. A time slot is a basic time unit and associated with it is a unique time slot index. During any particular time slot there could be a number of waveforms present that are used as the traffic, channel. The waveforms may or may not be orthogonal to each other. One or more waveforms are grouped together as a waveform set. Each waveform set has a unique waveform set index. A traffic segment is defined as a combination of prescribed time slot and waveform set indices. In general, a traffic segment contains prescribed waveforms over a prescribed finite time interval.

In a given system, different traffic segments may contain time slots having time intervals of different duration and having waveform sets with different bandwidths. For example, as shown in FIG. 4, traffic segment #1 402 contains one time slot and two waveforms, while segment #2 403 contains two time slots and four waveforms.

In this example, all the traffic data between the base station 101 and the wireless terminals 103 is conveyed on traffic segments. A traffic segment is the basic (minimum) unit of the traffic channel resource. The traffic channel resource is allocated in a form of traffic segment allocation. That is, the base station 101 assigns traffic segments to the wireless terminals 103 in the cell such that the assigned wireless terminals 103 receive traffic in the assigned downlink traffic segments. To address the above issue of flexibly switching the traffic channel between multicast point-to-point traffic, according to the invention, the traffic channel is managed in a form of traffic segments. Indeed, in this example, the traffic segments for multicast purposes are not separate from those used for the normal point-to-point purpose. That is, a traffic segment can transport either multicast or point-to-point traffic data.

Assignment information is also conveyed in a form of segments, called assignment segments. Assignment segments are separate from traffic segments. In this example the assignment channel is employed as the common control channel for transporting both the individual wireless terminal's 103 identifier and the multicast wireless terminal group's identifier, in accordance with the invention.

Figure 5:
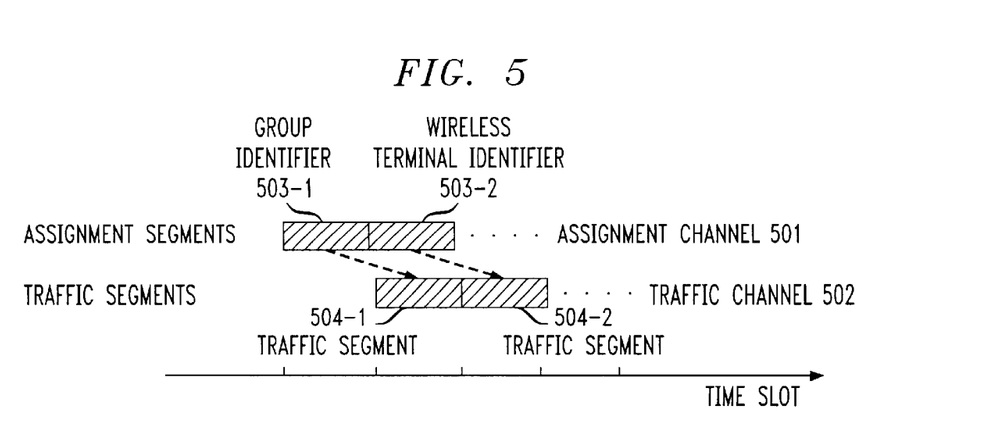
FIG. 5 is a graphical representation illustrating a prescribed relationship between assignment segments and traffic segments also useful in describing the invention.

FIG. 5 is a graphical representation illustrating a prescribed relationship between assignment segments and traffic segments also useful in describing the invention. FIG. 5 illustrates the prescribed association between assignment segments and traffic segments in assignment channel 501 and traffic channel 502, respectively. Thus, as shown, the downlink wireless channel resource (bandwidth and time interval) is partitioned into an assignment channel 501 and a traffic channel 502, among other channels. The assignment channel 501 includes assignment segments 503-1 through 503-N and the traffic channel includes traffic segments 504-1 through 504-M. The sizes, in waveforms and time slots, of different assignment segments 503 may not be the same, and the sizes, in waveforms and time slots, of different traffic segments 504 may not be the same either. However, the partitioning of the assignment channel 501 and traffic channel 502 is fixed, and the structure of assignment segments 503 and traffic segments 504 is also determined a priori. In a preferred embodiment, each assignment segment 503 is associated with a traffic segment 504 in a prescribed one-to-one manner.

The multicast paging messages are transmitted in the assignment segments. Therefore, the common control channel that transports multicast paging messages is a special control channel of assignment, which is always monitored by all active mobiles anyway. Advantageously, this eliminates the need of monitoring additional common control channels by the mobiles for the multicast purpose. In addition, transmitting the multicast paging messages in the assignment channel does not introduce any delay of transmitting other normal common control messages.

The multicast paging messages transported in the assignment segments contain the identifier of the group of the mobiles who are intended to receive the corresponding multicast traffic. Therefore, an assignment segment may transport either a multicast group identifier or a specific wireless terminal identifier depending on whether the associated traffic segment carries multicast or point-to-point traffic data. It is noted that as described in the companion patent application Ser. No. 09/706,377 (R. Laroia-J. Li-S. V. Uppala Case 25-17-10), noted above, an assignment segment contains the identifier of a particular mobile for which the corresponding point-to-point traffic is intended. Therefore, the multicast group identifiers of all multicast groups that are supported by the base station should not overlap with the identifiers of all active wireless terminals 103 for the purpose of receiving point-to-point traffic. The corresponding multicast traffic is transmitted on the downlink traffic segment associated with the assignment segment that transmits the multicast paging message.

Consider a simple example of the association of traffic segments 504 and assignment segments 503. As shown in FIG. 5, each traffic segment 504 is associated with an assignment segment 503 in a prescribed fixed manner. Specifically, downlink traffic segment #1 504-1 is associated with assignment segment #A 503-1, and downlink traffic segment #2 504-2 is associated with assignment segment #B 503-2. In one example, the assignment segment 503-1 transports the multicast group identifier for multicast traffic, and the associated traffic segment 504-1 transports the corresponding multicast traffic data. Meanwhile, the assignment segment 503-2 transports a particular wireless terminal 103 identifier, and the associated traffic segment 504-2 transports the corresponding point-to-point traffic data. Since the association of a traffic segment 504 and an assignment segment 503 is determined in this prescribed manner, the assignment segment 503 does not necessarily have to contain the resource parameters of the associated traffic segment 504, i.e., the time slot and waveform set indices, thereby significantly reducing the overhead in transmitting assignment segments 503.

In a typical situation, the assignment information of a traffic segment 504 is transported in the associated assignment segment 503. However, there could be scenarios where an assignment segment 503 transports the assignment information for more than one traffic segment 504. The number of traffic segments 504 that are associated with an assignment segment 503 can be either fixed or variable. It should be noted that in the former example, the fixed number of traffic segments 504 is associated with an assignment segment 503, the plurality of traffic segments 504 in effect can be represented as a single larger traffic segment 504. Thus, the association between the plurality of traffic segments 504 with the assignment segment 503 still appears like a one-to-one association. In the latter example, the assignment segment 503 has to explicitly state that number. However, once that number is given, under some a priori arrangement, the assignment segment 503 can specify all the associated traffic segments 504 without explicitly stating their resource parameters.

In general, a traffic segment 504 does, not precede the associated assignment segment 503. The delay from the assignment segment 503 to the traffic segment 504 reflects the time the wireless terminal 103 takes to decode the assignment from the assignment segment 503 and to prepare to receive the traffic in the associated traffic segment 504. Therefore, the assignment segment 503 can be as early as the associated traffic segment 504. An important aspect of the invention is that there is no need to expressly include the multicast group identifier or the wireless terminal identifier in the traffic segments.

Figure 6:
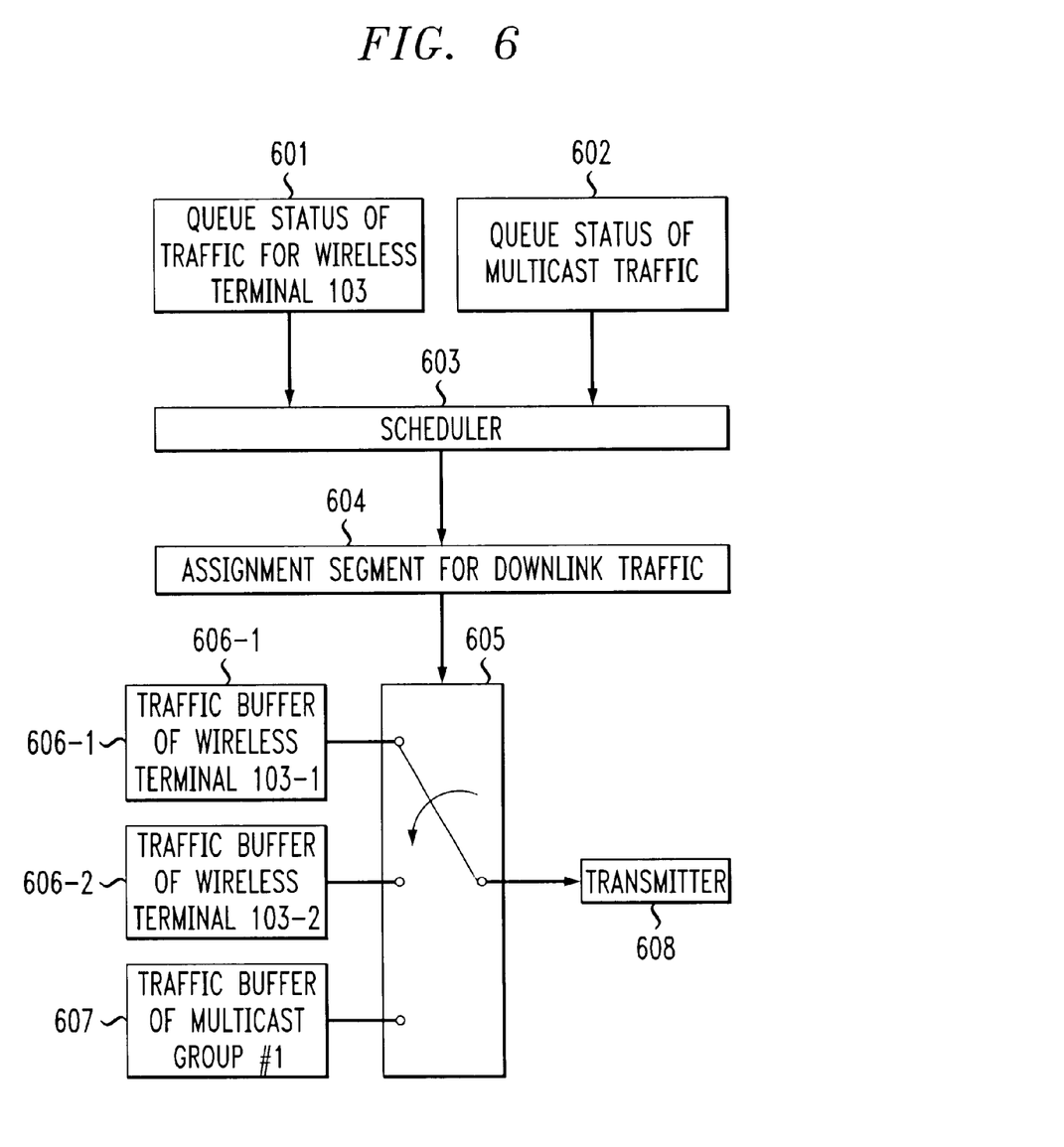
FIG. 6 shows, in simplified block diagram form, details of an embodiment of the invention in which segment assignment and scheduling are employed.

FIG. 6, shows, in simplified block diagram form, details of an embodiment of the invention in which segment assignment and scheduling are employed. In the following example, only two traffic buffers 606 are shown and described for simplicity of exposition.

The base station 101 maintains a table of traffic queue status 601 for al point-to-point traffic of all wireless terminals 103, and maintains queue status 602 of all multicast group traffic. The base station scheduler 603 periodically checks the queue tables 601 and 602 and determines the traffic segment assignment based on some prescribed scheduling policy. The assignment is then broadcast in associated assignment segments via 604 for downlink traffic. Downlink traffic for the assigned wireless terminal 103, e.g., wireless terminal 103-1 or wireless terminal 103-2, or the assigned multicast group, e.g., multicast group #1, is then transmitted via transmitter 608 with the associated traffic segment by the base station 101. The downlink transmission is effected by controllable switching unit 605 being controlled to select the data for transmission from either a traffic buffer 606-1 for wireless terminal 103-1, traffic buffer.606-2 for wireless terminal 103-2 or traffic buffer 607 for multicast group #1.

Point-to-point traffic and multicast traffic can be easily mixed and scheduled in a flexible efficient manner. For example, suppose the base station 101 is transmitting traffic for wireless terminal 103-1. Now traffic for a particular multicast group #1 arrives, which is further assumed to have a high priority. The base station 101 simply puts the identifier of the multicast group #1 in the assignment associated with the downlink traffic segment, thereby changing the resource allocation without introducing significant latency. After the multicast traffic is transmitted, the base station 101 continues to broadcast the identifier of wireless terminal 103-1, thereby changing the resource allocation back to wireless terminal 103-1.

Figure 7:
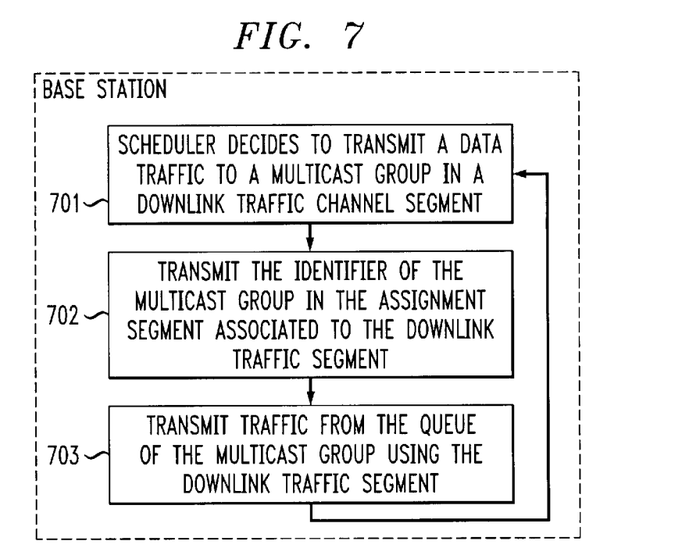
FIG. 7 is a flowchart illustrating steps in a base station process for transmitting a multicast message in accordance with the invention.

FIG. 7 is a flowchart illustrating steps in a base station 101 process for transmitting a multicast message to a group of wireless terminals 103, in accordance with the invention. The process is started in step 701 by base station 101 scheduler 603 deciding to transmit traffic data to a prescribed multicast group in a downlink traffic segment. Then, in step 702 base station 101 transmits the identifier of the multicast group in the assignment segment associated via 604 with the downlink traffic segment. Step 703 causes the transmission of traffic data from the traffic buffer for the multicast group, e.g., multicast group #1 buffer 607, in the downlink traffic segment.

Figure 8:
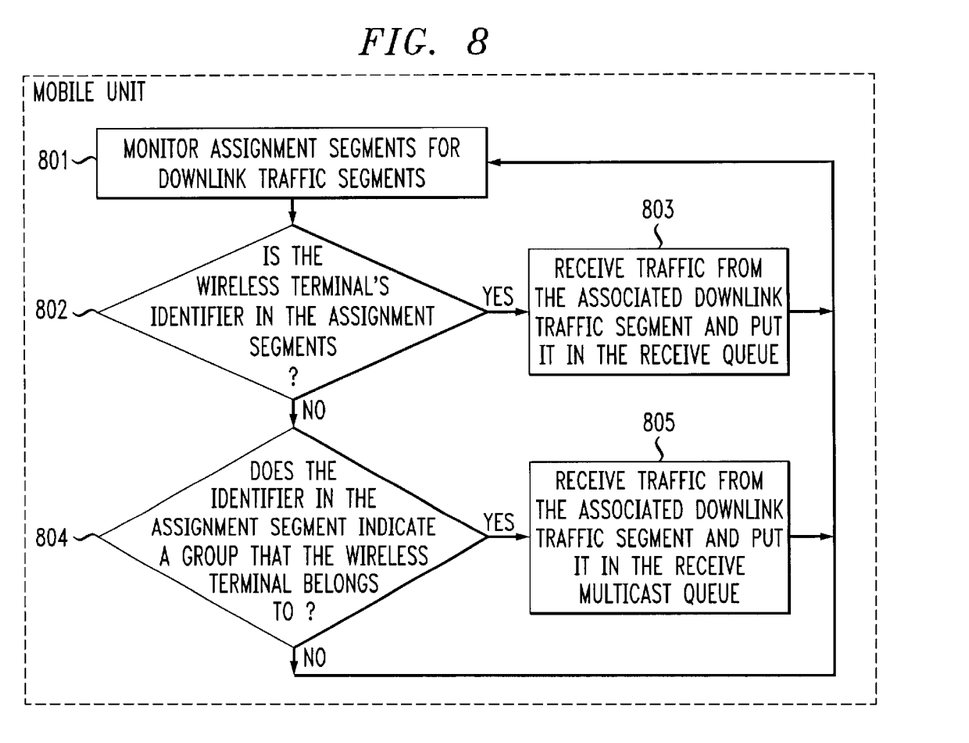
FIG. 8 is a flowchart illustrating steps in a wireless terminal process for detecting reception of a multicast message in accordance with the invention.

FIG. 8 is a flowchart illustrating steps in a wireless terminal 103 process for detecting reception of a multicast message in accordance with the invention. The process started in step 801 by the wireless terminal 103 monitoring the received assignment segments for downlink traffic segments. Then, step 802 tests to determine whether the wireless terminal's identifier is in the assignment segment. If the test result in step 802 is YES, step 803 causes the wireless terminal 103 to receive traffic data from the downlink traffic segment associated with the assignment segment and to store it in a receive queue (not shown) for the wireless terminal 103. Thereafter, control is returned to step 801 and the receive process is restarted. If the test result in step 802 is No, step 804 tests to determine whether the identifier in the assignment segment indicates a multicast group that the wireless terminal 103 belong to. If the test result instep 804 is Yes, step 805 causes the wireless terminal 103 to receive traffic data from the downlink traffic segment associated with the assignment segment and to store it in a receive multicast queue (not shown). Thereafter, control is returned to step 801 and the receive process is restarted. If the test result in step 804 is NO, control is returned directly to step 801 and the receive process is restarted.

The above-described embodiments are, of course, merely illustrative of the principles of the invention. Indeed, numerous other methods or apparatus may be devised by those skilled in the art without departing from the spirit and scope of the invention. Moreover, the invention may be implemented as hardware, as an integrated circuit, via programming on a microprocessor, on a digital signal processor or the like.

What is claimed is:

1. A method for use in a wireless multiple access communications system including at least one base station and a plurality of wireless terminals to transmit multicast traffic data in a resource channel comprising the steps of:

transmitting a multicast paging message, including a multicast group wireless terminal identifier, in a common control channel in said resource channel and associated with a traffic channel destined for a group of wireless terminals intended to receive said multicast traffic data;

generating said resource channel so it is defined by a bandwidth and time interval, and includes said traffic channel and an assignment channel, said traffic channel being comprised of a plurality of traffic segments and said assignment channel being said common control channel and being comprised of a plurality of assignments segments;

selecting each of said traffic segments from a first set of predetermined waveforms in a predetermined time interval;

selecting each of said assignment segments from a second set of predetermined waveforms in a predetermined time interval;

said traffic channel and said assignment channel each being generated as a separate channel in said channel resource so that there is a one-to-one association between said traffic segments of said traffic channel and individual ones of said assignment segments of said assignment channel; and said step of transmitting including steps of transmitting either multicast traffic data in one or more of said plurality of traffic segments of said traffic channel and a multicast paging message including a multicast group wireless terminal identifier in an associated assignment segment of said assignment channel in said corresponding channel resource destined for a group of wireless terminals intended to receive said multicast traffic data, or point-to-point traffic data in one or more of said plurality of traffic segments of said traffic channel and a wireless terminal identifier in an associated assignment segment of said assignment channel, in said corresponding channel resource destined for a particular wireless terminal intended to receive said point-to-point traffic data.

2. The method as defined in claim 1 wherein said wireless terminals are mobile wireless terminals.

3. The method as defined in claim 1 wherein said wireless terminals are fixed wireless terminals.

4. The method as defined in claim 1 wherein said common control channel is common to all active ones of said plurality of wireless terminals.

5. The method as defined in claim 1 wherein said multicast paging message further includes a representation of a specific location of said associated traffic channel for carrying the multicast traffic data.

6. The method as defined in claim 5 wherein said representation of said specific location includes a prescribed bandwidth and time interval.

7. The method as defined in claim 6 further including the step of normally transmitting a specific paging message, including a specific wireless terminal identifier and a representation of a specific location of a traffic channel for carrying point-to point traffic data, in said common control channel in place of said multicast paging message.

8. The method as defined in claim 1 wherein said common control channel and said traffic channel are in a prescribed fixed association with each other.

9. The method as defined in claim 8 further including the step of normally transmitting a specific paging message, including a specific wireless terminal identifier and a representation of a specific location of a traffic channel for carrying point-to point traffic data, in said common control channel in place of said multicast paging message.

10. The method as defined in claim 8 wherein each of said assignment segments is associated with said traffic segments in a prescribed fixed manner.

11. The method as defined in claim 8 further including the step of scheduling the assignment of said traffic segments in accordance with a prescribed scheduling policy.

12. The method as defined in claim 11 wherein for a multicast paging message said step of scheduling includes the steps of determining the traffic segment assignment, transmitting said traffic channel assignment in an assignment segment to said group on wireless terminals and transmitting traffic data intended to be received by said group of wireless terminals in one or more traffic segments associated with said assignment segment.

13. The method as defined in claim 12 wherein said step of scheduling further includes the steps of determining whether the paging message is a multicast paging message or a specific wireless terminal paging message, when said determination indicates a specific wireless terminal paging message, transmitting said specific wireless terminal identifier in said assignment segment, transmitting traffic data intended to be received by said specific wireless terminal in one or more traffic segments associated with said assignment segment, when said determination indicates a multicast paging message, transmitting said multicast group identifier in said assignment segment, transmitting traffic data intended to be received by said group of wireless terminals in one or more traffic segments associated with said assignment segment.

14. The method as defined in claim 8 including a step of detecting assignment of a downlink traffic resource to a wireless terminal.

15. The method as defined in claim 14 wherein said step of detecting includes the steps of monitoring received assignment segments for assignments of downlink traffic segments, determining whether said wireless terminal's specific identifier is included in any detected assignment segments and in response to a determination that said wireless terminal's specific identifier is in a detected assignment segment, receiving traffic data from said downlink traffic segment associated with said assignment segment including said wireless terminal's specific identifier.

16. The method as defined in claim 14 wherein said step of detecting includes the steps of monitoring received assignment segments for assignments of downlink traffic segments, determining whether said wireless terminal's multicast group identifier is included in any detected assignment segments and in response to a determination that said wireless terminal's multicast group identifier is in a detected assignment segment, receiving traffic data from said downlink traffic segment associated with said assignment segment including said wireless terminal's multicast group identifier.

17. A method for use in a wireless terminal in a wireless multiple access communications system to detect assignment of a downlink traffic resource in a resource channel to the wireless terminal, comprising the steps of:
generating said resource channel so it is defined by a bandwidth and time interval and includes said traffic channel and an assignment channel, said traffic channel being comprised of a plurality of traffic segments, and said assignment channel being comprised of a plurality of assignments segments,
selecting each of said traffic segments from a first set of predetermined waveforms in a predetermined time interval;
selecting each of said assignment segments from a second set of predetermined waveforms in a predetermined time interval;
said traffic channel and said assignment channel each being generated as a separate channel in said channel resource so that there is a one-to-one association between said traffic segments of said traffic channel and individual ones of said assignment segments of said assignment channel,
monitoring received assignment segments of said assignment channel for assignments of downlink traffic segments of said traffic channel;
determining whether said wireless terminal's multicast group identifier is included in any detected assignment segments;
determining whether said wireless terminal's specific identifier is included in any detected assignment segment;
in response to a determination that said wireless terminal's multicast specific identifier is in a detected assignment segment, receiving traffic data from said downlink traffic segment associated on said one-to-one basis with the assignment segment including the wireless terminal's specific identifier; and
in response to a determination that said wireless terminal's multicast group identifier is in a detected assignment segment, receiving traffic data from said downlink. traffic segment associated on said one-to-one basis with the assignment segment including the wireless terminal's multicast group identifier.

18. The method as defined in claim 17, wherein said wireless terminals are mobile wireless terminals.

19. The method as defined in claim 17, wherein said wireless terminals are fixed wireless terminals.

20. Apparatus for use in a wireless multiple access communications system including at least one base station and a plurality of wireless terminals to transmit multicast traffic data in a resource channel comprising:
a transmitter for transmitting a multicast paging message, including a multicast group wireless terminal identifier, in a common control channel associated with a traffic channel destined for a group of wireless terminals intended to receive said multicast traffic data;
a processor for controlling a generator to generate a resource channel,
said resource channel being defined by a bandwidth and time interval and including a traffic channel and an assignment channel,
said traffic channel being comprised of a plurality of traffic segments and said assignment channel being comprised of a plurality of assignment segments;
said processor controlling a selector to select each of said traffic segments from a first set of predetermined waveforms in a predetermined time interval and selecting each of said assignment segments from a second set of predetermined waveforms in a predetermined time interval, said traffic channel and said assignment channel each being generated as a separate channel in said channel resource and so that there is a one-to-one association between said traffic segments of said traffic channel and individual ones of said assignment segments of said assignment channel; and
said processor controlling said transmitter to transmit either multicast traffic data in one or more of said plurality of traffic segments of said traffic channel and a multicast paging message including a multicast group wireless terminal identifier in an associated assignment segment of said assignment channel in said corresponding channel resource destined for a group of wireless terminals intended to receive said multicast traffic data, or point-to-point traffic data in one or more of said plurality of traffic segments of said traffic channel and a wireless terminal identifier in an associated assignment segment of said assignment channel in said corresponding channel resource destined for a particular wireless terminal intended to receive said point-to-point traffic data.

21. The apparatus as defined in claim 20 wherein said wireless terminals are mobile wireless terminals.

22. The apparatus as defined in claim 20 wherein said wireless terminals are fixed wireless terminals.

23. The apparatus as defined in claim 20 wherein said common control channel is common to all active ones of said plurality of wireless terminals.

24. The apparatus as defined in claim 20 wherein said multicast paging message further includes a representation of a specific location of said associated traffic channel for carrying the multicast traffic data.

25. The apparatus as defined in claim 24 wherein said representation of said specific location includes a prescribed bandwidth and time interval.

26. The apparatus as defined in claim 25 wherein said transmitter transmits a specific paging message, including a specific wireless terminal identifier and a representation of a specific location of a traffic channel for carrying point-to point traffic data, in said common control channel in place of said multicast paging message.

27. The apparatus as defined in claim 20 wherein said common control channel and said traffic channel are in a prescribed fixed association with each other.

28. The apparatus as defined in claim 27, wherein said transmitter normally transmits a specific paging message, including a specific wireless terminal identifier and a representation of a specific location of a traffic channel for carrying point-to point traffic data, in said common control channel in place of said multicast paging message.

29. The apparatus as defined in claim 27, wherein each of said assignment segments is associated with said traffic segments in a prescribed fixed manner.

30. The apparatus as defined in claim 27 further including a scheduler for scheduling the assignment of said traffic segments in accordance with a prescribed scheduling policy.

31. The apparatus as defined in claim 30 wherein said scheduler includes a detector responsive to a representation that a multicast paging message is being transmitted for determining the traffic segment assignment, and said transmitter transmits said traffic channel assignment in an assignment segment to said group of wireless terminals and transmits traffic data intended to be received by said group of wireless terminals in one or more traffic segments associated with said assignment segment.

32. The apparatus as defined in claim 31 wherein said detector further determines whether the paging message being transmitted is a multicast paging message or a specific wireless terminal paging message, when said determination indicates a specific wireless terminal paging message, said transmitter transmits said specific wireless terminal identifier in said assignment segment and transmits traffic data intended to be received by said specific wireless terminal in one or more traffic segments associated with said assignment segment, when said determination indicates a multicast paging message, said transmitter transmits said multicast group identifier in said assignment segment and transmits traffic data intended to be received by said group of wireless terminals in one or more traffic segments associated with said assignment segment.

33. The apparatus as defined in claim 27 including a detector for detecting assignment of a downlink traffic resource to a wireless terminal.

34. The apparatus as defined in claim 33 further including a receiver in each of said plurality of wireless terminals, and wherein said detector includes a monitor for monitoring received assignment segments for assignments of downlink traffic segments, said detector determining whether said wireless terminal's specific identifier is included in any detected assignment segments and in response to a determination that said wireless terminal's specific identifier is in a detected assignment segment, said receiver receiving traffic data from said downlink traffic segment associated with said assignment segment including said wireless terminal's specific identifier.

35. The apparatus as defined in claim 33 further including a receiver in each of said plurality of wireless terminals, and wherein said detector includes a monitor for monitoring received assignment segments for assignments of downlink traffic segments, said detector determining whether said wireless terminal's multicast group identifier is included in any detected assignment segments and in response to a determination that said wireless terminal's multicast group identifier is in a detected assignment segment, said receiver receiving traffic data from said downlink traffic segment associated with said assignment segment including said wireless terminal's multicast group identifier.

36. Apparatus for use in a wireless terminal in a wireless multiple access communications system to detect assignment of a downlink traffic resource to the wireless terminal comprising:

a processor for controlling a generator to generate a resource channel, said resource channel being defined by a bandwidth and time interval and including a traffic channel and an assignment channel.

said traffic channel being comprised of a plurality of traffic segments and said assignment channel being comprised of a plurality of assignment segments, said processor controlling a selector to select each of said traffic segments from a first set of predetermined waveforms in a predetermined time interval and selecting each of said assignment segments from a second set of predetermined waveforms in a predetermined time interval said traffic channel and said assignment channel each being generated as a separate channel in said channel resource and so that there is a one-to-one association between said traffic segments of said traffic channel and individual ones of said assignment segments of said assignment channel;

a monitor for monitoring received assignment segments of said assignment channel for assignments of downlink traffic segments of said traffic channel;

a detector for determining whether said wireless terminal's multicast group identifier is included in any detected assignment segment and for determining whether said wireless terminal's specific identifier is included in any detected detected assignment segment; and a receiver for receiving multicast traffic data from said downlink traffic segment associated on said one-to-one basis with the assignment segment including the wireless terminal's multicast group identifier, said receiver being responsive to a determination that said wireless terminal's multicast specific identifier is in a detected assignment segment to receive traffic data from said downlink traffic segment associated on said one-to-one basis with the assignment segment including the wireless terminal's specific identifier, and said receiver being responsive to a determination that said wireless terminal's multicast group identifier is in a detected assignment segment to receive traffic data from said downlink traffic segment associated on said one-to-one basis with the assignment segment including the wireless terminal's multicast group identifier.

37. The apparatus as defined in claim 36, wherein said wireless terminals are mobile wireless terminals.

38. The apparatus as defined in claim 36 wherein said wireless terminals are fixed wireless terminals.

* * * * *